(12) United States Patent
Pinel et al.

(10) Patent No.: US 9,852,380 B2
(45) Date of Patent: Dec. 26, 2017

(54) COMPUTING PERSONALIZED PROBABILISTIC FAMILIARITY BASED ON KNOWN ARTIFACT DATA

(71) Applicant: International Business Machines Corporation, Armonk, NY (US)

(72) Inventors: Florian Pinel, New York, NY (US); Nan Shao, Ridgefield, CT (US); Kush R. Varshney, Ossining, NY (US); Lav R. Varshney, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 14/587,021

(22) Filed: Dec. 31, 2014

(65) Prior Publication Data

US 2015/0199614 A1     Jul. 16, 2015

Related U.S. Application Data

(60) Provisional application No. 61/928,092, filed on Jan. 16, 2014.

(51) Int. Cl.
| | | |
|---|---|---|
| *G06N 99/00* | (2010.01) | |
| *G06Q 10/06* | (2012.01) | |
| *G06K 9/00* | (2006.01) | |

(52) U.S. Cl.
CPC ......... *G06N 99/00* (2013.01); *G06K 9/00496* (2013.01); *G06Q 10/067* (2013.01)

(58) Field of Classification Search
CPC .................................................. G06N 99/00
See application file for complete search history.

(56) References Cited

U.S. PATENT DOCUMENTS

| 8,145,512 B1 | 3/2012 | Henne et al. |
|---|---|---|
| 8,386,482 B2 | 2/2013 | Gopalakrishnan |
| 2008/0201690 A1 | 8/2008 | Lovisa et al. |

(Continued)

FOREIGN PATENT DOCUMENTS

| CN | 103198296 A | 7/2013 |
|---|---|---|
| EP | 1571579 A1 | 9/2005 |

(Continued)

OTHER PUBLICATIONS

Prime and T. Shultz, "Explicit Bayesian Reasoning with Frequencies, Probabilities, and Surprisals", in Proc. of 33rd Annual Conf. Cog. Sci. Society, 2011, pp. 1918-1923.*

(Continued)

*Primary Examiner* — Vincent Gonzales
(74) *Attorney, Agent, or Firm* — William H. Hartwell

(57) ABSTRACT

Software that uses personalized information pertaining to a user to determine how familiar (or "novel" or "surprising") a new artifact will be to the user, by performing the following steps: (i) receiving the identity of a first user; (ii) receiving a first dataset pertaining to the first user; (iii) receiving the identity of a first artifact; and (iv) applying a probabilistic familiarity algorithm to the first dataset with respect to the first artifact to yield a probabilistic familiarity value for the first artifact with respect to the first user. The first dataset is received over a computer network, and the first dataset includes at least one piece of personalized information for the first user.

18 Claims, 11 Drawing Sheets

(56) References Cited

U.S. PATENT DOCUMENTS

| | | | |
|---|---|---|---|
| 2011/0271187 A1 | 11/2011 | Sullivan et al. | |
| 2014/0136432 A1* | 5/2014 | Fallows | G06Q 30/0282 705/319 |

FOREIGN PATENT DOCUMENTS

| | | |
|---|---|---|
| WO | 0004464 A1 | 1/2000 |
| WO | 2011005157 A1 | 1/2011 |
| WO | 2011130028 A2 | 10/2011 |

OTHER PUBLICATIONS

L. Itti and P. Baldi, "Bayesian Surprise Attracts Human Attention", in Advances in Neural Info. Proc. Sys., 2005, pp. 547-554.*

S. Russell and P. Norvig, Artificial Intelligence: A Modern Approach, 2nd Ed., 2003, pp. 649-789.*

CY Teng et al., "Recipe recommendation using ingredient networks", Proc. 4th Annual ACM Web Science Conf., 2012, pp. 298-307.*

Jagmohan et al., "Exploring Application Domains for Computational Creativity", Fifth International Conference on Computational Creativity, Ljubljana, Slovenia, Jun. 9-13, 2014.

Kelley, Kevin, "The Three Breakthroughs That Have Finally Unleashed AI on the World", Wired Insider, Oct. 27, 2014, <http://www.wired.com/2014/10/future-of-artificial-intelligence/>.

Nay, Chris, "See What's Cooking in the Cognitive Kitchen", Building a Smarter Planet. A Smarter Planet Blog, Mar. 6, 2014, <http://asmarterplanet.com/blog/2014/03/cooking-computers.html>.

Pinel et al., "Computational Creativity for Culinary Recipes", CHI 2014, Apr. 26-May 1, 2014, Toronto, Ontario, Canada, ACM 978-1-4503-2474-8/14/04, pp. 439-442, Grace Period Disclosure Document.

Shao et al., "Computational Creativity for Personalized Artifact Creation", Wednesday Nov. 12, 2014, 11:00-12:30, <https://informs.emeetingsonline.com/emeetings/formbuilder/clustersessiondtl.asp?csnno=21055&mmnno=260&ppnno=78135>, Grace Period Disclosure Document.

Shao et al., "New Developments in Culinary Computational Creativity", Fifth International Conference on Computational Creativity, Ljubljana, Slovenia, Jun. 9-13, 2014, Grace Period Disclosure Document.

Shao et al., "Personalization of Product Novelty Assessment via Bayesian Surprise", Sunday, Aug. 3, 2014 : 4:00 PM to 5:50 PM, JSM 2014 Online Program, <http://www.amstat.org/meetings/jsm/2014/onlineprogram/AbstractDetails.cfm?abstractid=311091>, Grace Period Disclosure Document.

U.S. Appl. No. 61/928,092 entitled "Computational Creativity Process for Generating Novel Work Products", filed Jan. 16, 2014.

Varshney et al., "A Big Data Approach to Computational Creativity", arXiv:1311.1213v1 [cs.CY], Nov. 5, 2013.

* cited by examiner

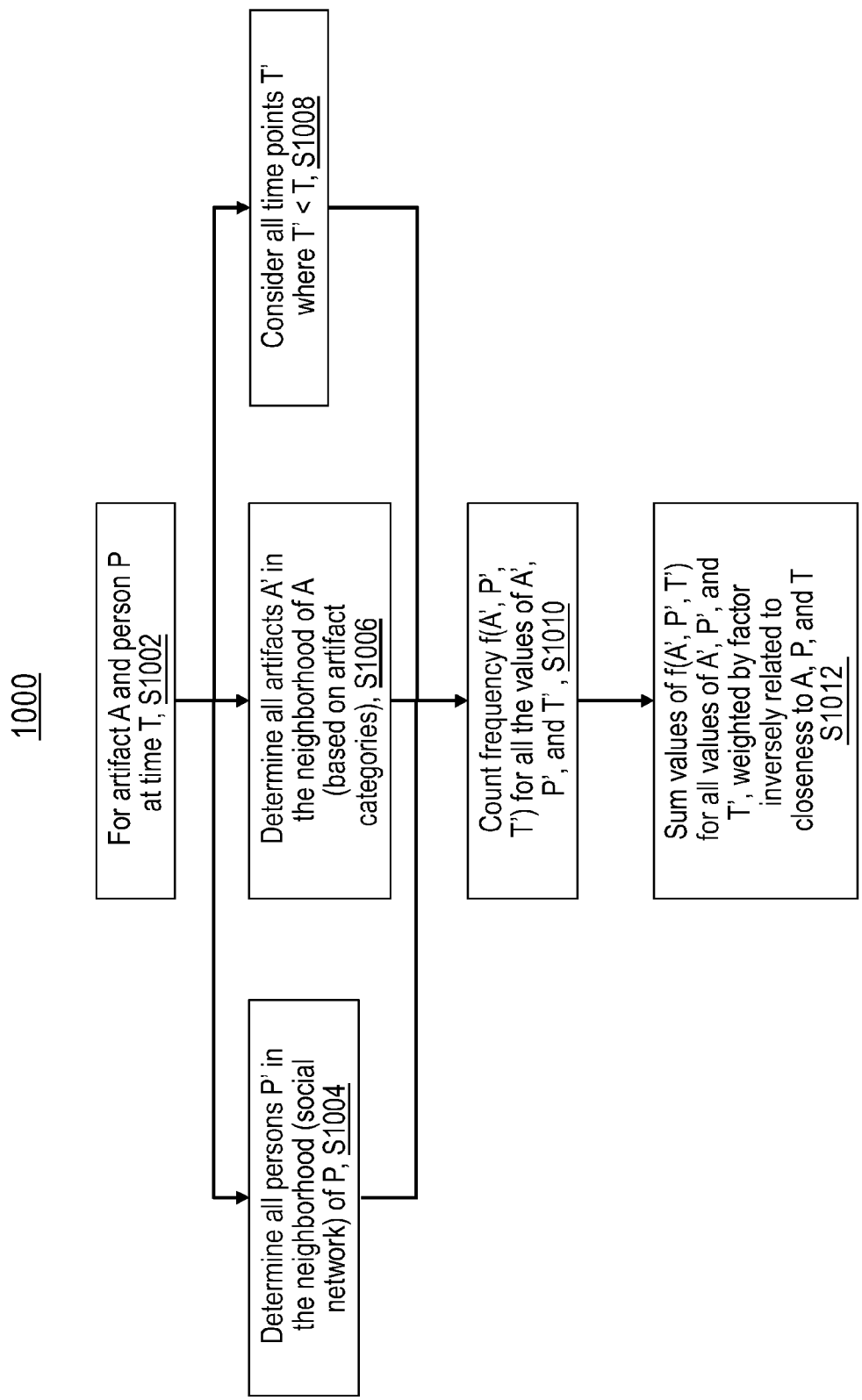

COMPUTING PERSONALIZED PROBABILISTIC FAMILIARITY BASED ON KNOWN ARTIFACT DATA

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "Computational Creativity for Culinary Recipes", Florian Pinel and Lav R. Varshney, CHI 2014, Apr. 26-May 1, 2014, Toronto, Ontario, Canada, pages 439-442;

(ii) "Computational Creativity for Personalized Artifact Creation", Nan Shao, Pavankumar Murali, and Anshul Sheopuri, INFORMS annual meeting, Wednesday, Nov. 12, 2014;

(iii) "New Developments in Culinary Computational Creativity", Nan Shao, Pavankumar Murali, and Anshul Sheopuri, Fifth International Conference on Computational Creativity, Jun. 9-13, 2014; and (iv) "Personalization of Product Novelty Assessment via Bayesian Surprise" Nan Shao, Kush R. Varshney, Lav R. Varshney, and Florian Pinel, JSM 2014 Online Program, Aug. 3, 2014.

BACKGROUND OF THE INVENTION

The present invention relates generally to the field of measuring familiarity, and more particularly to measuring the probabilistic familiarity of artifacts.

Bayesian statistics is a known statistical field where information is expressed in terms of degrees of belief or, more specifically, probabilities. In Bayesian statistics, a prior probability distribution represents the probability of certain events occurring before some new evidence is taken into account, and a posterior probability distribution represents the conditional probability of the same events occurring after the new evidence is taken into account.

Bayesian surprise is known. Bayesian surprise is the quantification of the difference (or change) between a prior probability distribution and a corresponding posterior probability distribution. Bayesian surprise can be used in machine learning to determine how novel (or surprising) a new item (or "artifact") is given a known dataset of existing items. One way to quantify the difference between a prior probability distribution and a corresponding posterior probability distribution is by calculating a Kullback-Leibler divergence, which is a measure of the information gained by moving from the prior probability distribution to the posterior probability distribution.

SUMMARY

According to an aspect of the present invention, there is a method, computer program product, and/or system that performs the following steps (not necessarily in the following order): (i) receiving the identity of a first user; (ii) receiving a first dataset pertaining to the first user; (iii) receiving the identity of a first artifact; and (iv) applying a probabilistic familiarity algorithm to the first dataset with respect to the first artifact to yield a probabilistic familiarity value for the first artifact with respect to the first user. The first dataset is received over a computer network, and the first dataset includes at least one piece of personalized information for the first user.

BRIEF DESCRIPTION OF THE DRAWINGS

FIG. 10 is a third embodiment method performed, at least in part, by the second embodiment system.

DETAILED DESCRIPTION

Figure 1:
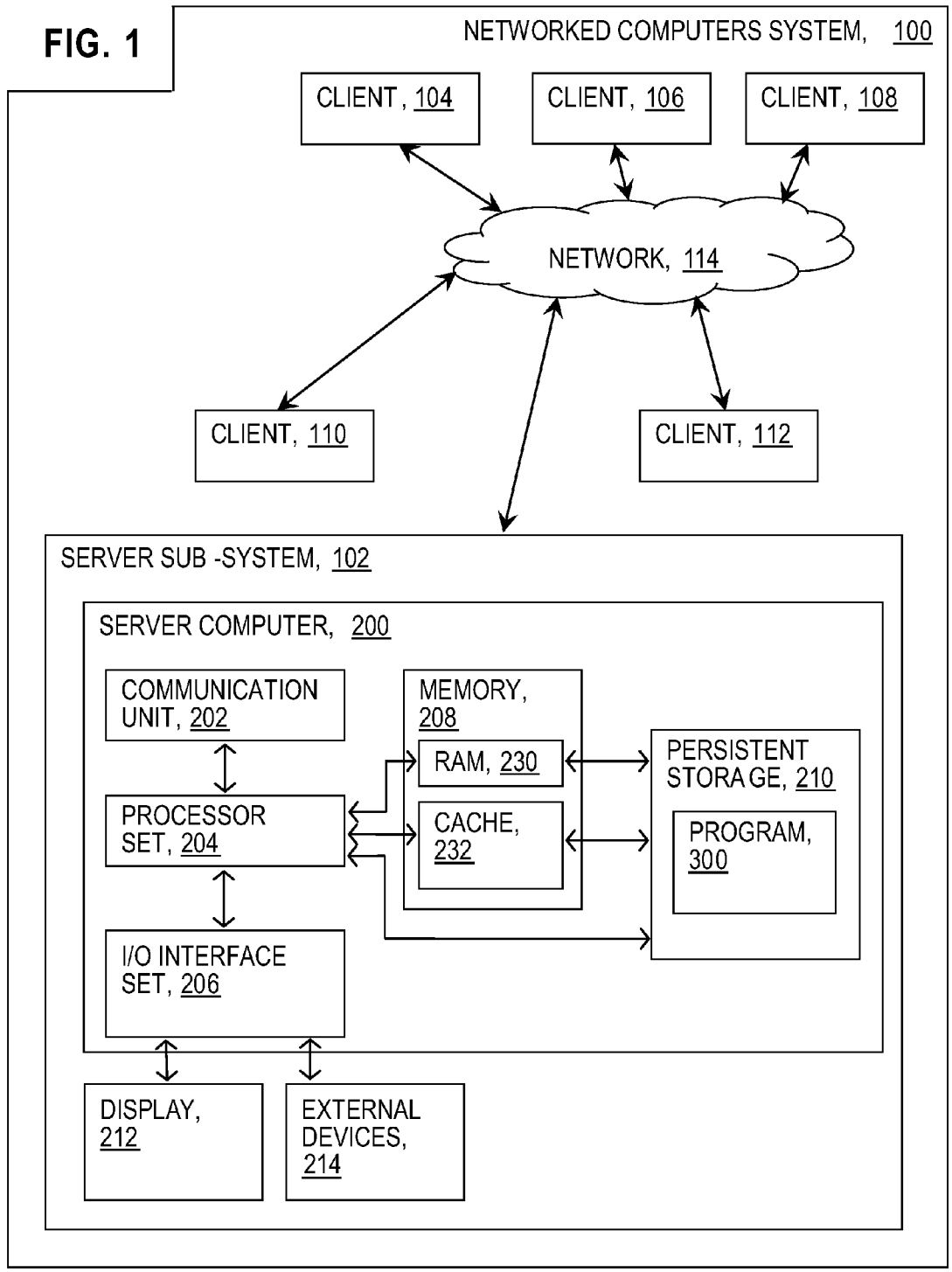
FIG. 1 is a block diagram view of a first embodiment of a system according to the present invention.

Embodiments of the present invention use personalized information pertaining to a user to determine how familiar (or "novel" or "surprising") a new artifact will be to the user. Personalized information includes, for example, the user's activity on social networking services, the user's online purchase history, and/or the user's browser history. This Detailed Description section is divided into the following sub-sections: (i) The Hardware and Software Environment; (ii) Example Embodiment; (iii) Further Comments and/or Embodiments; and (v) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
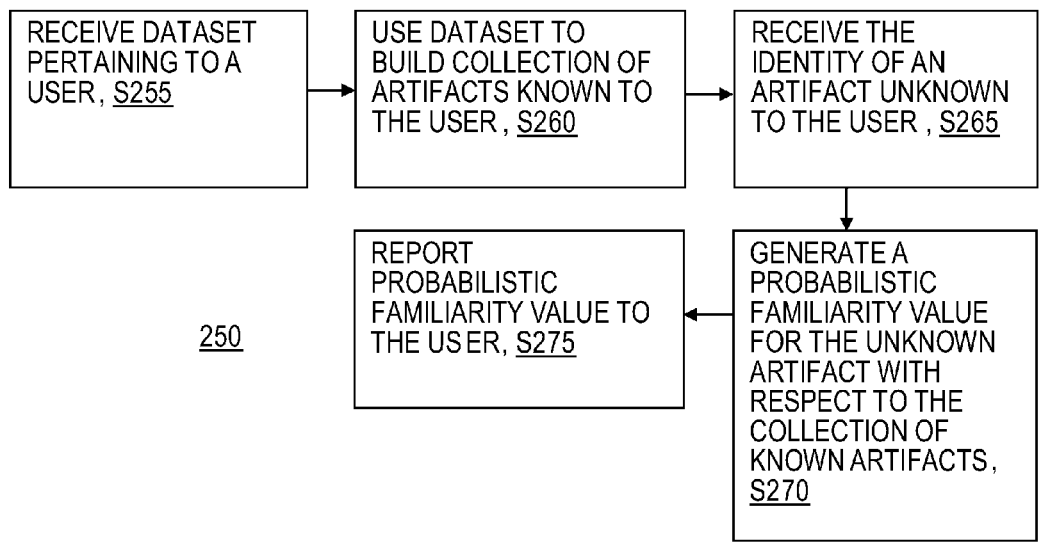
FIG. 2 is a flow chart showing a first embodiment method performed, at least in part, by the first embodiment system.
Figure 3A:
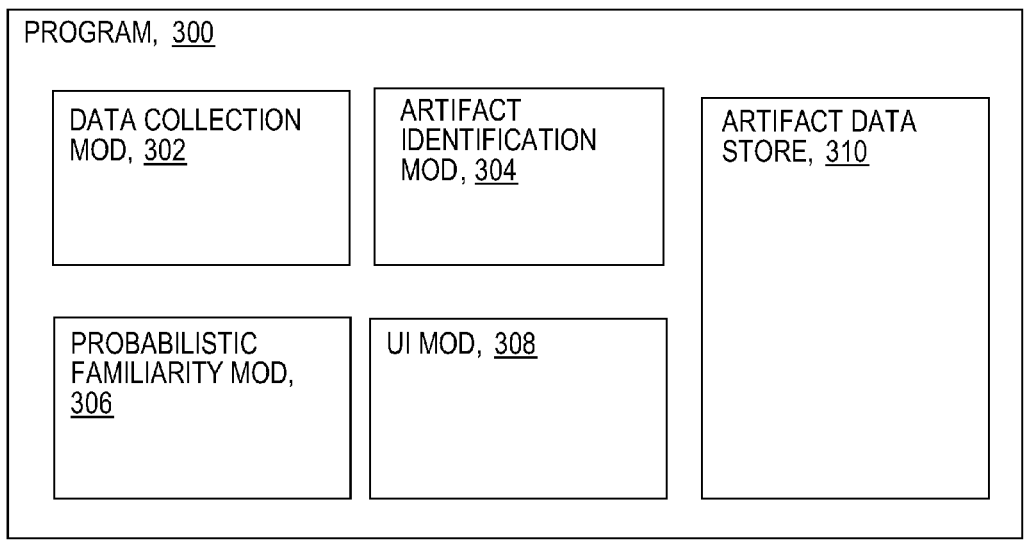
FIG. 3A is a block diagram view of a machine logic (for example, software) portion of the first embodiment system.

FIG. 2 shows flowchart 250 depicting a method according to the present invention. FIG. 3A shows program 300 for performing at least some of the method steps of flowchart 250. This method and associated software will now be discussed, over the course of the following paragraphs, with extensive reference to FIG. 2 (for the method step blocks) and FIG. 3A (for the software blocks).

Method 250 is adapted to use personalized information pertaining to a user to determine how familiar (or "novel" or "surprising") a new artifact will be to the user. As used herein, an artifact may be any item (whether existing conceptually or in physical space) that is able to be identified by the user. In the present example embodiment, to be discussed throughout this sub-section, artifacts include television shows. Other examples of artifacts are discussed below in the Further Comments and/or Embodiments sub-section of this Detailed Description.

Processing begins at step S255, where data collection module ("mod") 302 (see FIG. 3A) receives a dataset pertaining to the user. The dataset may be received in a variety of ways including, for example, over a computer network. Additionally, the data in the dataset may come in a wide variety of forms. For example, the data may include textual content, photographs, videos, and/or any other known (or yet to be known) type of multimedia content.

In many embodiments of the present invention, the dataset pertaining to the user includes some amount of personalized information for the user. Generally speaking, personalized information includes any information that is likely to have been created by, or viewed by, the user. For example, personalized information can include the user's activity on a social networking service (SNS), activity the user can view on a SNS, the user's online purchase history, and/or the user's browser history (for additional discussion of social networking services and personalized information, see the Definitions sub-section of this Detailed Description).

The amount of personalized information contained in the dataset may vary between embodiments. In some embodiments, a single piece of personalized information is included in the dataset. However, in other embodiments, a certain personalized information threshold must be met in order for the dataset to be received (in one embodiment, for example, 80% of the information in the dataset must be personalized information). Additionally, it should be noted that information other than personalized information may be helpful in determining the user's familiarity of an unknown artifact. For example, in some embodiments, the dataset may include general, well-known knowledge that the user is assumed (but not confirmed) to know (such as, for example, information relating to personalized information in the dataset). The dataset may also include personalized information for social networking connections of the user (that is, the dataset may include information that is personal for the user's connections, as opposed to the user). Furthermore, the dataset may also include personalized information for social networking connections of the social networking connections of the user (or "second degree" social networking connections), and so on (for more examples of social networking connections, see the Definitions sub-section of this Detailed Description).

In the present example embodiment, the dataset includes information about two television shows: a science fiction show and a detective show. For personalized information, the dataset includes the user's SNS postings about the two shows and the user's online purchase history of episodes of the two shows. Additionally, the dataset includes non-personalized information relating to the shows, including information about the actors and the companies that produce the shows.

Figure 3B:
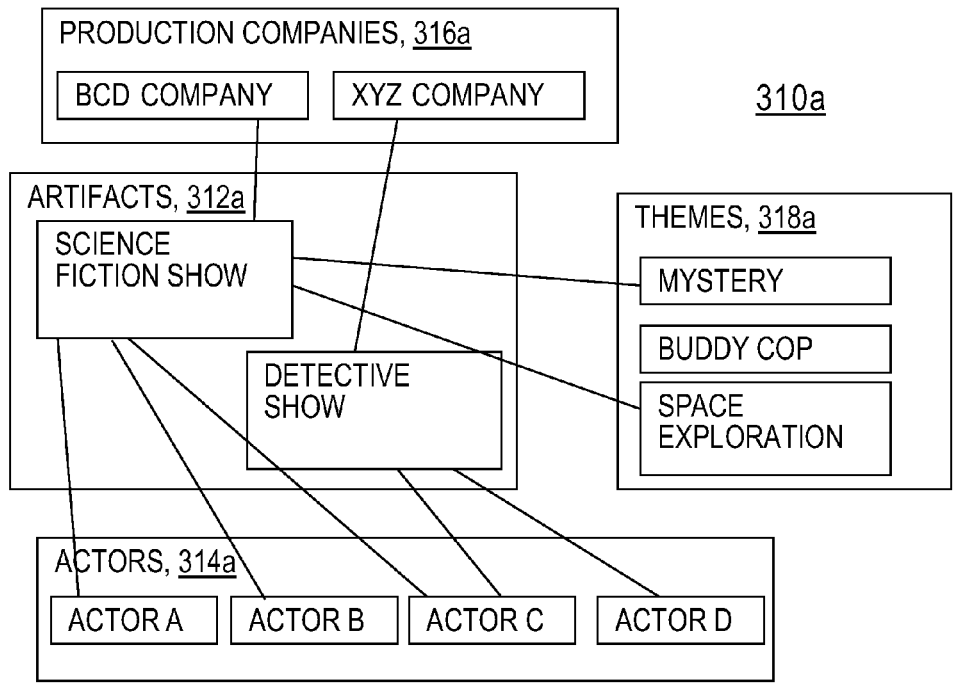
FIG. 3B is a block diagram that is helpful in understanding the first embodiment system.

Processing proceeds to step S260 (see FIG. 2), where artifact identification mod 304 (see FIG. 3A) uses the dataset to build a collection of artifacts known to the user. The collection of artifacts is stored in artifact data store 310. The collection of artifacts may be structured and/or built in a wide variety of ways so as to model the user's knowledge of the artifacts. For example, in many embodiments, the artifacts contain various characteristics, components, and/or categories (generally referred to as "characteristics"). The characteristics help method 250 determine similarities/differences between artifacts and ultimately determining the probabilistic familiarity of the unknown artifact (to be discussed in later steps). In the present example embodiment, the television show information is structured such that the artifacts (television shows) include the following characteristics: actors, production companies, and themes. An example representation of the collection of artifacts 312a stored in artifact data store 310a is shown in FIG. 3B. As shown in FIG. 3B, the science fiction show has the following characteristics: (i) it stars actors "Actor A", "Actor B", and "Actor C" (shown in actors data store 314a); (ii) it was produced by "BCD Company" (shown in production companies data store 316a); and (iii) it has themes of "Mystery" and "Space Exploration" (shown in themes data store 318a). Additionally, the detective show: (i) stars actors "Actor C" and "Actor D" (shown in actors data store 314a); (ii) was produced by "XYZ Company" (shown in production companies data store 316a); and (iii) has themes of "Mystery" and "Buddy Cop" (shown in themes data store 318a).

Processing proceeds to step S265, where artifact identification mod 304 (see FIG. 3A) receives the identity of an artifact that is unknown to the user (or "unknown artifact"). The unknown artifact may be received from a wide variety of possible sources. For example, in some embodiments, the unknown artifact is an existing artifact being recommended to the user. In other embodiments, the unknown artifact may be an entirely novel artifact produced using a method for creating novel artifacts. In the present example embodiment, the unknown artifact is an existing television show (a situation comedy).

Processing proceeds to step S270, where probabilistic familiarity mod 306 (see FIG. 3A) generates a probabilistic familiarity value ("PFV") for the unknown artifact with respect to the collection of known artifacts by applying a probabilistic familiarity algorithm. Generally speaking, the probabilistic familiarity algorithm may include one or more of a number of known probability-based methods for calculating familiarity (or "novelty" or "surprise"). In many embodiments, a Bayesian surprise-based algorithm is used (for a further discussion of probabilistic familiarity and Bayesian surprise-based algorithms, see the Further Comments and/or Embodiments sub-section of this Detailed Description).

Figure 3C:
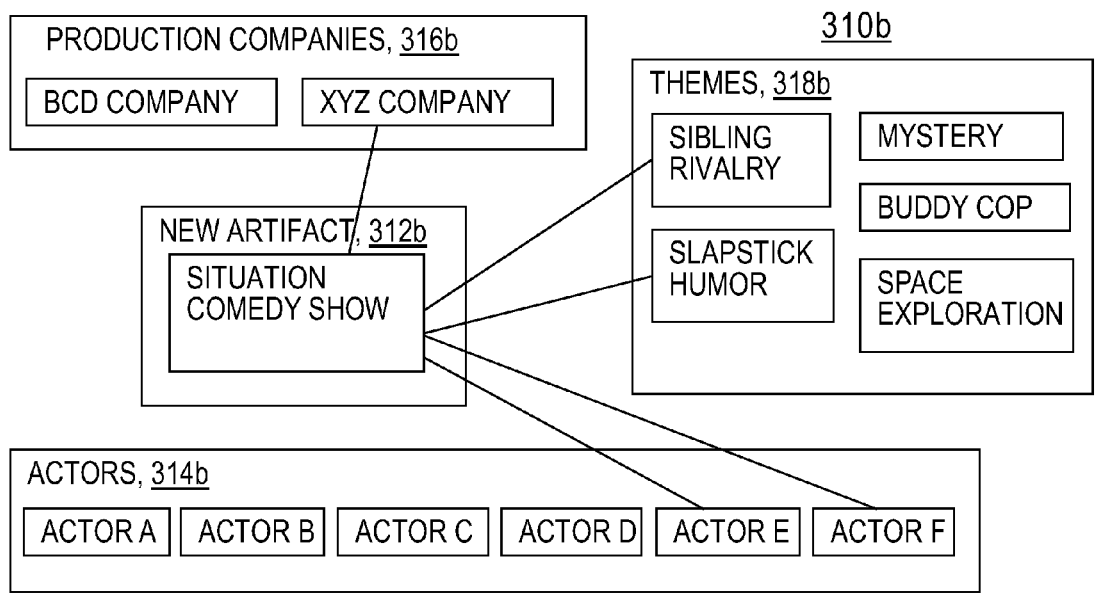
FIG. 3C is a block diagram that is helpful in understanding the first embodiment system.

In the present example embodiment, the PFV is generated by first adding the unknown artifact to the artifact data store and incorporating it into the existing collection of artifacts. FIG. 3C shows a portion of artifact data store 310b, indicating the characteristics for the unknown artifact (including existing characteristics of known artifacts and new characteristics unique to the unknown artifact). Specifically, the unknown artifact (i.e. the situation comedy show), which is shown in new artifact store 312b: (i) stars actors "Actor E" and "Actor F" (shown in actors data store 314b); (ii) was produced by "XYZ Company" (shown in production companies data store 316b); and (iii) has themes of "Sibling Rivalry" and "Slapstick Humor" (shown in themes data store 318b). Based on this information, probabilistic familiarity mod 306 determines that the situation comedy show has a probabilistic familiarity value of 1 (indicating a low level of familiarity due to the large differences between the cast and themes of the situation comedy show and the known shows).

Processing proceeds to step S275, where UI mod 308 (see FIG. 3A) reports the PFV to the user. In the present example embodiment, the probabilistic familiarity value is displayed on a screen as part of a television show recommendation engine. Based on the score, the recommendation engine informs the user that the user will be likely to find the situation comedy show to be novel and surprising, due to a lack of familiarity with the show's known characteristics. That being said, in other embodiments, the PFV may not be displayed to the user at all, or may be displayed only if the PFV is below a probabilistic familiarity threshold. In some embodiments, for example, if the PFV is below the probabilistic familiarity threshold, the artifact is added to a list of artifacts that are not familiar to the user. UI mod 308 may then determine whether to display the PFV to the user based on a set of display conditions.

III. Further Comments and/or Embodiments

Some embodiments of the present invention recognize the following facts, potential problems, and/or potential areas for improvement with respect to the current state of the art as relates to novelty and/or surprise: (i) existing solutions do not use Bayesian surprise to quantify the novelty of a product or personalize a novelty assessment; (ii) some existing solutions focus on the decay of novelty; (iii) existing solutions do not use social networks, shared contents, or purchase history to create a personalized set of artifacts known to a given user; (iv) many known solutions do not define components and artifacts in an ontology; and/or (v) known solutions that recommend existing products do not evaluate the novelty of product candidates that haven't been made yet.

Some embodiments of the present invention may include one, or more, of the following features, characteristics, and/or advantages: (i) creating a personalized novelty assessment specific to a targeted observer and/or a targeted social group; (ii) measuring the change in an observer's belief of known artifacts after observing a newly created artifact (where the larger the change is, the more surprising the newly created artifact is); (iii) characterizing an observer's belief by the probability distribution of artifacts; (iv) incorporating temporal proximity as a measure of belief, as artifacts may be forgotten over time; (v) incorporating social proximity as a measure of belief, as an artifact known to a member of an observer's social network is more likely to be known by the observer; (vi) using ontologies to define artifacts, artifact components, and data sources; and/or (vii) extending ontologies beyond typical domains for a personalized novelty assessment.

Figure 4:
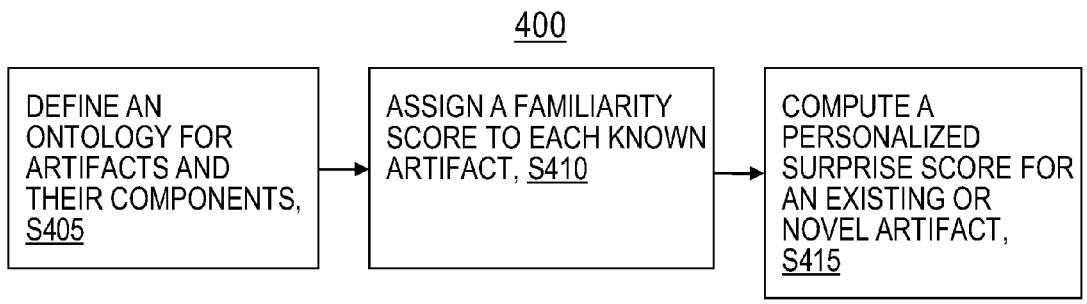
FIG. 4 is a flow chart showing a second embodiment method according to a second embodiment system of the present invention.
Figure 5:
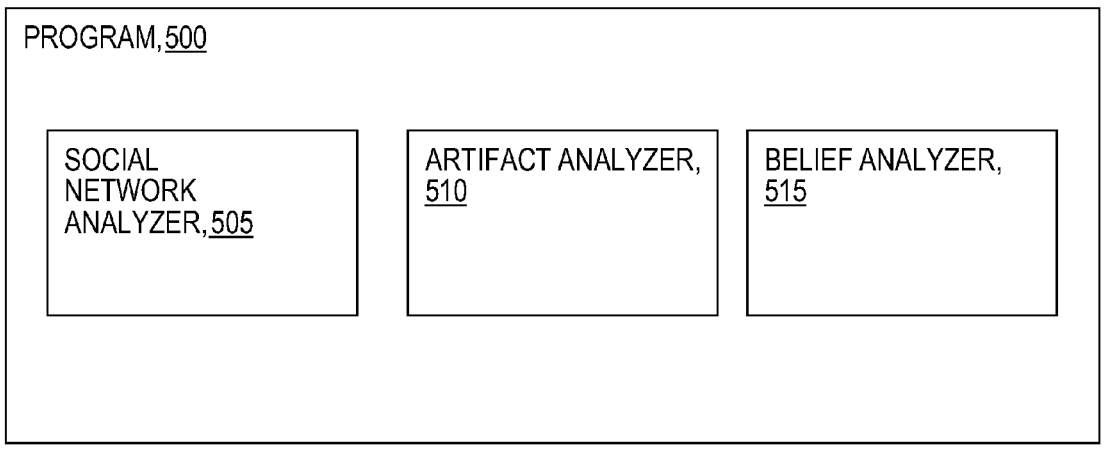
FIG. 5 is a block diagram showing a machine logic (for example, software) portion of the second embodiment system.

Some embodiments of the present invention use social networks, shared contents, purchase history, and internet activity history to create a personalized set of artifacts (and artifact components) known to a given user. FIG. 4 shows flowchart 400 depicting a method according to the present invention, and FIG. 5 shows program 500 for performing at least some of the method steps of flowchart 400. This method and associated software will now be discussed, over the course of the following paragraphs, with reference to FIG. 4 (for the method step blocks) and FIG. 5 (for the software blocks).

Processing begins at step S405, where social network analyzer 505 (see FIG. 5) identifies social connections, and artifact analyzer 510 (see FIG. 5) retrieves information from the social connections to define an ontology of artifacts and their components. In this step: (i) a domain is defined (such as food); (ii) information about known artifacts and components is collected from various data sources; and (iii) the known artifacts are decomposed into components. The result of step S405 is an ontology of artifacts and components that is personalized for the specific user.

Social network analyzer 505 is adapted to identify the user's social network connections. Social network connections may include, for example, anyone who is connected to the user via an Internet-based social networking service. Additionally, network connections may include second degree connections (connections of existing connections) and third degree connections (connections of second degree connections). However, this is not meant to be limiting, and social network analyzer 505 may be adapted to identify social connections from a wide variety of sources and in a wide variety of ways.

Once connections have been identified, artifact analyzer 510 (see FIG. 5) scans the identified connections for known artifacts and artifact components. Additionally, artifact analyzer 510 may scan information from other available data sources, such as the user's search history, websites the user has visited, and purchases the user has made. Information from a particular data source may be used on its own or in combination with information from other data sources to identify artifacts and artifact components. Some examples of possible scanning methods include: (i) text parsing, to identify names of artifacts, components, and categories from text; (ii) image recognition, to identify artifacts, components, and categories from pictures; and/or (iii) web-crawling, to analyze network connections.

Figure 6:
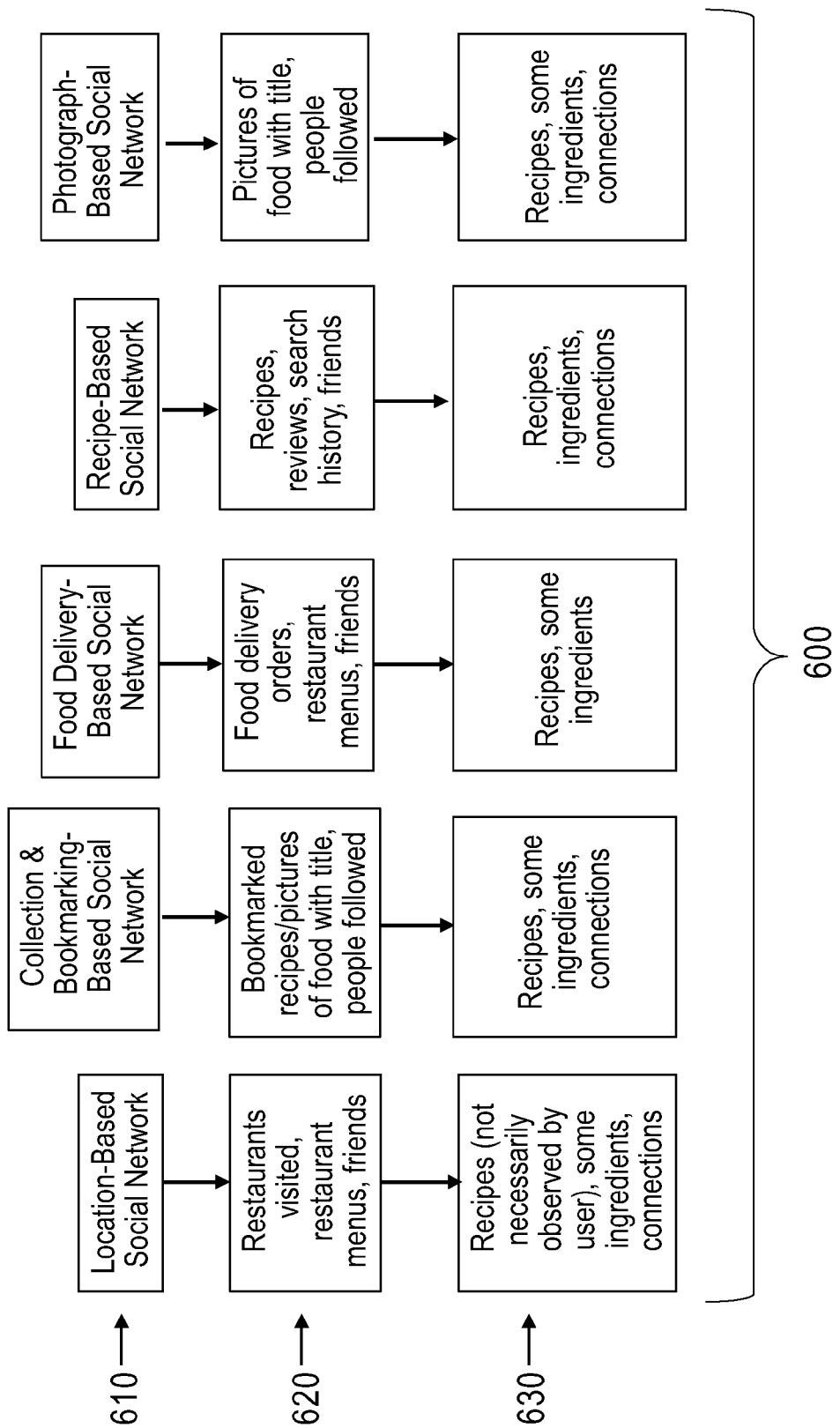
FIG. 6 is a block diagram showing information that is helpful in understanding the second embodiment system.

Diagram 600 (see FIG. 6) shows some examples of artifacts (and components) in the "food" domain that are retrievable from social networks. Referring to FIG. 6: (i) row 610 shows various types of social networks; (ii) row 620 shows types of information that can be retrieved from those social networks; and (iii) row 630 shows artifacts, artifact components, and other useful items that can be extracted from that information. For example, with a location-based social network, artifact analyzer 510 can generally retrieve information about the restaurants visited, restaurant menus, and friends of the user. This information can be translated into: (i) artifacts, such as recipes; (ii) artifact components, such as ingredients; and (iii) user social network connections, where the connections themselves may include additional recipes and ingredients.

Figure 7:
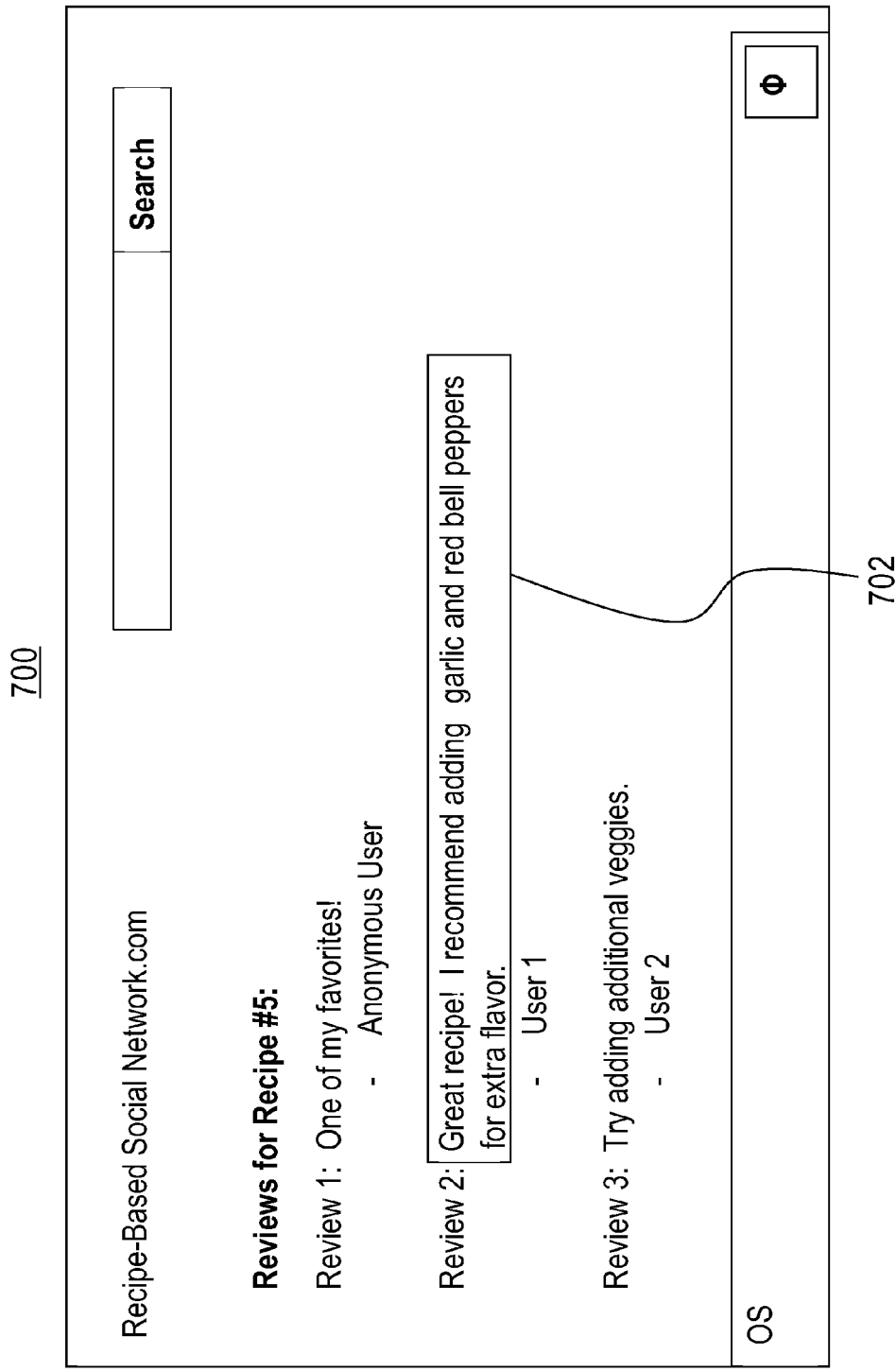
FIG. 7 is a screenshot view generated by the second embodiment system.

An example of information contained in a recipe-based social network is shown in screenshot 700 (see FIG. 7). In this example, the recipe-based social network includes recipes (with corresponding ingredients) as well as user comments about the recipes. Selected area 702, which includes the text "I recommend adding garlic and red bell peppers for extra flavor," shows a specific user comment that can be used in creating artifacts and components. Specifically, this comment (which was made by the user) shows that the user has been exposed to both garlic and red bell peppers. Additionally, it provides information about the user's preferences; based on the comment, artifact analyzer 510 is able to conclude that the user enjoys garlic and red bell peppers, and that the user has created his own recipe with those ingredients. In this case, the user is acting as an agent of innovation by not only viewing and using artifacts, but modifying them in ways that matter to the user.

Once artifacts and components have been identified, belief analyzer 515 (see FIG. 5) uses those artifacts and components to create ontologies. In many embodiments, ontologies will be created at both the artifact level and the component level, in order to identify the artifact/component traits needed to properly calculate novelty and/or surprise (discussed below). Furthermore, for similar reasons, multiple ontologies may be created for each artifact/component type.

Figure 8B:
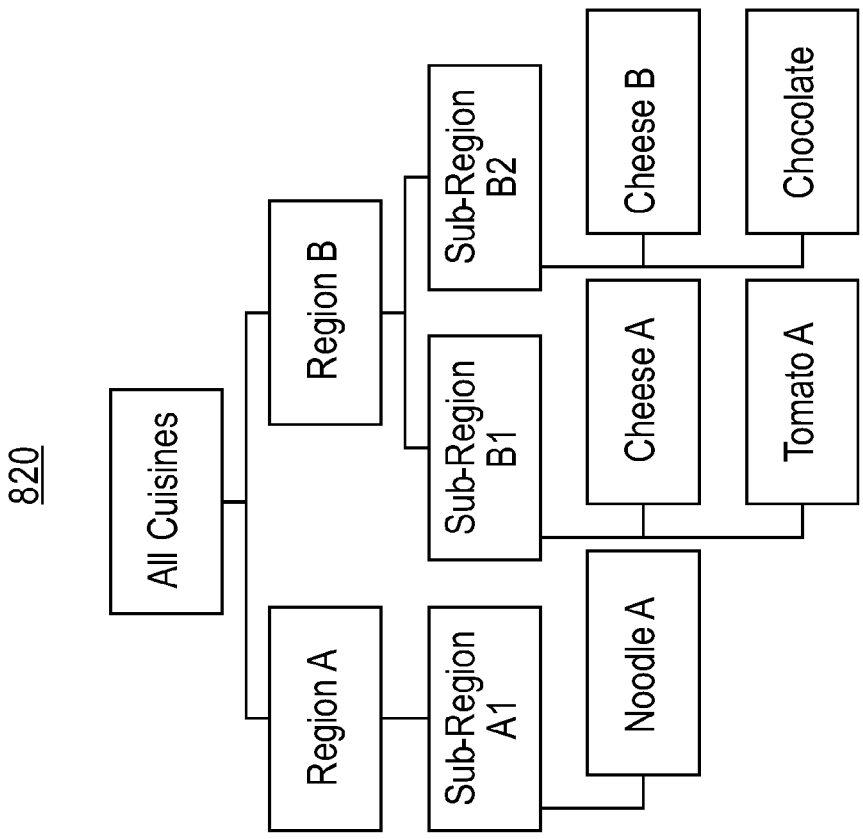
FIG. 8B is a tree diagram showing information that is helpful in understanding the second embodiment system.
Figure 8A:
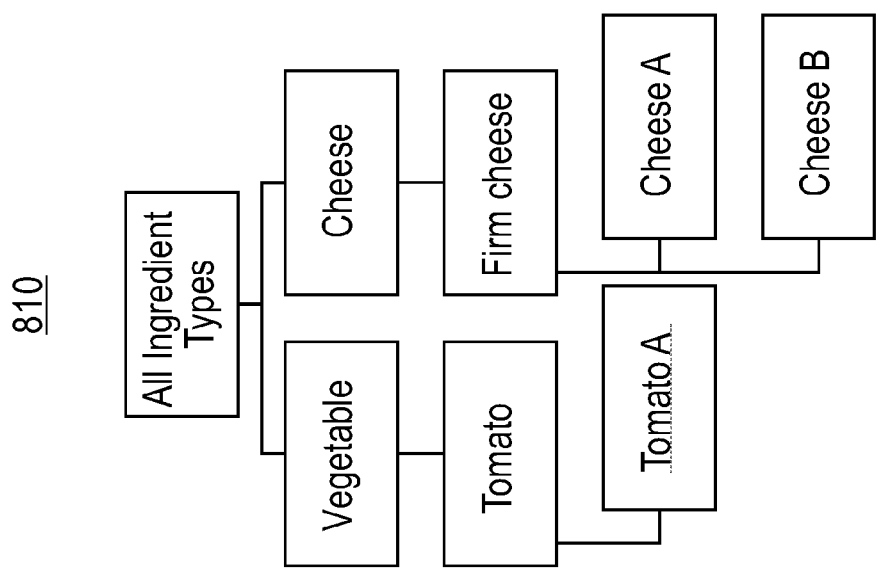
FIG. 8A is a tree diagram showing information that is helpful in understanding the second embodiment system.
Figure 8C:
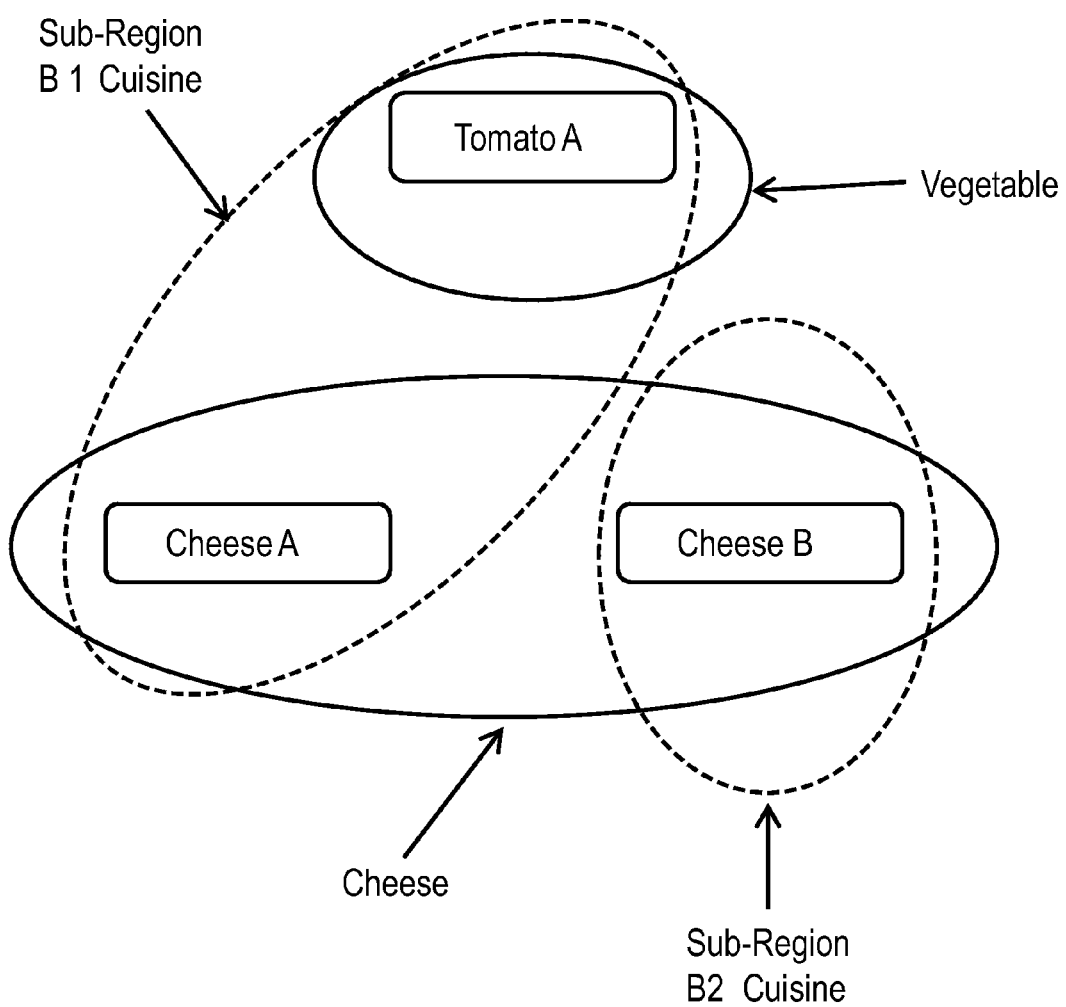
FIG. 8C is a diagram showing information that is helpful in understanding the second embodiment system.
Figure 9C:
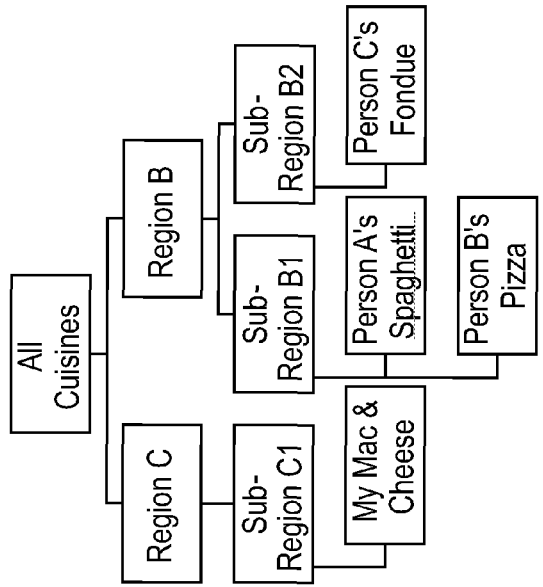
FIG. 9C is a tree diagram showing information that is helpful in understanding the second embodiment system.
Figure 9A:
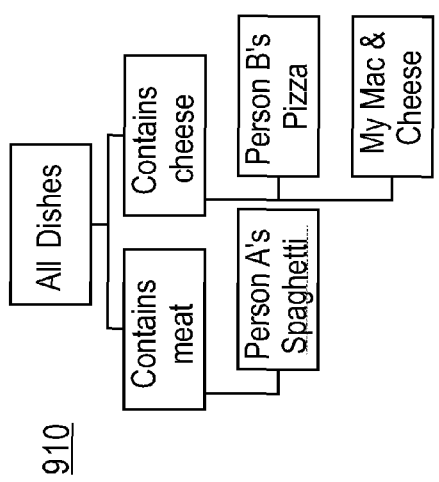
FIG. 9A is a tree diagram showing information that is helpful in understanding the second embodiment system.
Figure 9B:
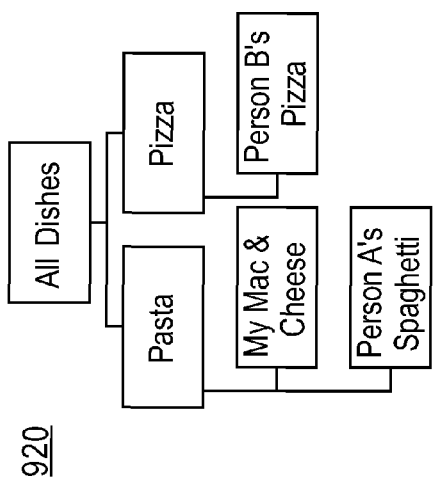
FIG. 9B is a tree diagram showing information that is helpful in understanding the second embodiment system.
Figure 9D:
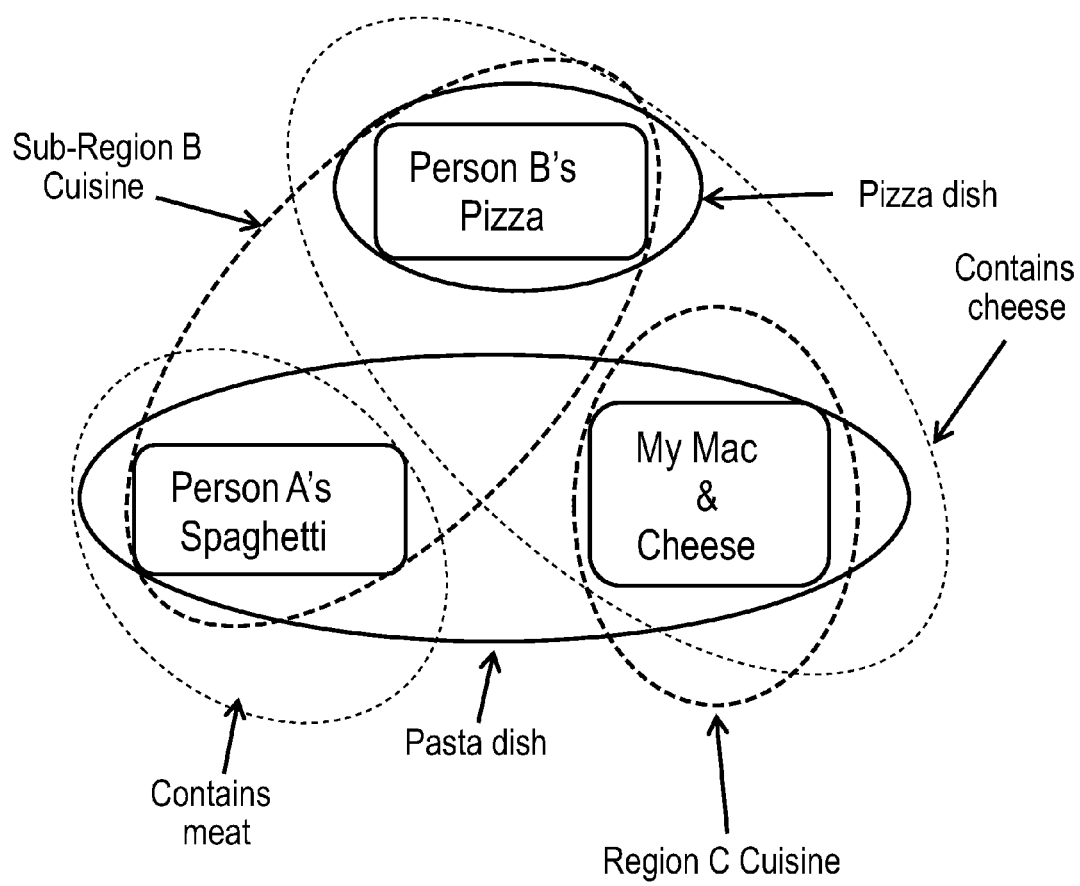
FIG. 9D is a diagram showing information that is helpful in understanding the second embodiment system.

Some ontologies according to an example embodiment of the present embodiment are shown in FIG. 8A, FIG. 8B, FIG. 8C, FIG. 9A, FIG. 9B, FIG. 9C, and FIG. 9D. FIGS. 8A, 8B, and 8C depict ontologies of artifact components (in this case, ingredients), while FIGS. 9A, 9B, 9C, and 9D depict ontologies of artifacts (in this case, recipes). Specifically, with regard to ingredient ontologies: (i) diagram 810 (see FIG. 8A) depicts an ontology of ingredients organized by ingredient type; (ii) diagram 820 (see FIG. 8B) depicts an ontology of ingredients organized by cuisine type; and (iii) diagram 830 (see FIG. 8C) shows a visual representation of the ontologies of FIGS. 8A and 8B, with ingredients grouped based on their shared characteristics. Regarding recipe ontologies: (i) diagram 910 (see FIG. 9A) depicts an ontology of recipes organized by dish type (meat or cheese); (ii) diagram 920 (see FIG. 9B) depicts an ontology of recipes organized by dish type (pizza or pasta); (iii) diagram 930 (see FIG. 9C) depicts an ontology of recipes organized by cuisine (for example, regions the recipes are typically associated with); and (iv) diagram 940 (see FIG. 9D) shows a visual representation of the ontologies of FIGS. 9A, 9B, and 9C, with recipes grouped based on their shared characteristics.

Processing then proceeds to step S410 (see FIG. 4), where belief analyzer 515 (see FIG. 5) assigns a familiarity score (also referred to as a prior probability score/distribution) to each known artifact. Belief analyzer 515 may use a wide variety of methods to do this. Method 1000 (shown in FIG. 10) is an example of one such method for determining prior probability distributions. Processing begins at step S1002, where method 1000 identifies an artifact (or component) A, a person P (the person who observed the artifact), and a time T (the time at which person P observed the artifact).

Processing proceeds to steps S1004, S1006, and S1008 (see FIG. 10). In step S1004, method 1000 determines all persons (P') in the neighborhood (or social network) of P. In step S1006, method 1000 determines all artifacts (A') in the neighborhood of A (based on artifact categories). In step S1008, method 1000 determines all time points (T') prior to the time T that artifact A was observed.

Processing proceeds to step S1010, where method 1000 counts the frequency for all values of A', P', and T' (represented as f(A', P', T')). Then, processing proceeds to step S1012, where the sum of the values of f(A', P', T') is weighted by a factor inversely related to the closeness of A, P, and T.

The closeness to A (or the "ontology closeness") may be determined in a wide variety of ways. In some embodiments, the closeness to A (that is, the distance between A' and A) is determined by using the following formula:

$$d(A,A') = l(A) + l(A') - 2l(LCA(A,A'))$$

In these embodiments, "d" represents the distance, "l" is the node level, and "LCA" is the lowest common ancestor.

The closeness to P (or the "social proximity measure") may also be determined in a wide variety of ways. In some embodiments of the present invention, the social proximity measure may be represented by the minimum path length between P and P' in a social network graph. In other embodiments, the social proximity measure may equal the stationary probability of traversing from P to P' (or vice versa) through a random walk on a social network graph.

The closeness to T (or the "temporal proximity measure") may also be determined in a wide variety of ways. In some embodiments, the temporal proximity measure (which is a function of time) may be represented by the following equation:

$$R = e^{-\frac{t}{S}}$$

In these embodiments, "R" represents memory retention, "S" is the relative strength of a person's memory, and "t" is time.

In many embodiments of the present invention, once the ontology closeness, social proximity measure, and temporal proximity measure have been determined, method 1000 (see FIG. 10) uses them to create a weighted frequency ($\tilde{f}$) of artifact A to person P at time T. In one embodiment, the weighted frequency is represented by the following equation:

$$\tilde{f}(A, P, T) = \sum_{t' \leq T} w_T(T', T) \times \left\{ \sum_{\substack{p' \in \text{neighborhood of } P}} w_S(P', P) \times \left[ \sum_{\substack{a' \in \text{neighborhood of } A}} w_O(A', A) \times f(A', P', T') \right] \right\}$$

In this embodiment: (i) $w_O$ represents the weight inversely related to ontology closeness; (ii) $w_S$ represents the weight inversely related to social proximity; and (iii) $w_T$ represents the weight inversely related to temporal proximity. The weighted frequency equation is used for all known artifacts, thereby producing a familiarity score (or prior probability distribution) for each known artifact. Additionally, if desired: (i) a small pseudo count can be assigned to each unseen artifact composable by known artifact components; and (ii) the weighted frequencies can be normalized by taking a sum of the weighted frequencies.

Once a familiarity score has been generated for each artifact, processing then proceeds to step S415 (see FIG. 4), where belief analyzer 515 computes a personalized surprise score for a new existing or novel artifact. To compute the personalized surprise score, belief analyzer must first calculate the posterior probability distribution for the new artifact. The posterior probability distribution may be computed in a number of ways. For example, in one embodiment, the posterior probability distribution is calculated by adding the new artifact to the known artifacts and calculating the artifact's prior probability distribution using method 1000 (discussed above).

In some embodiments of the present invention, a Bayesian method (see Background) is used to calculate the posterior probability distribution. For example, in one embodiment, the following algorithm is used:

$$P(M \mid A) = \frac{P(A \mid M)}{P(A)} P(M)$$

In this example, "P" is a probability distribution, "M" is the set of artifacts known to the observer, and "A" is the new artifact being observed.

Once the posterior probability distribution has been determined, the personalized surprise score can be computed. The personalized surprise score may be computed in a number of ways. In the Bayesian example discussed above, the following algorithm may be used:

$$S(A, M) = D_{KL}(P(M \mid A) \parallel P(M)) = \Sigma_A P_2(A) \log \frac{P_2(A)}{P_1(A)}$$

In this example: (i) "S" is the surprise score; (ii) "A" is the new artifact being observed; (iii) "M" is the set of artifacts known to the observer; (iv) "P" is a probability distribution;

(v) $D_{KL}$ is a Kullback-Leibler divergence (see Background); (vi) $P_2(A)$ is the posterior probability of A; and (vii) $P_1(A)$ is the prior probability of A.

To provide an example, in one embodiment, a user's existing recipe (artifact) repository includes two recipes: (a, b, c) and (b, c, d), where a, b, c, and d are ingredients (components). In this example, a personalized surprise score for new recipe (a, b, e) is being determined. The following table shows the prior probability and posterior probability for each ingredient (where "ϵ" represents the weight of unseen ingredient "e" in the existing recipe repository):

|  | Ingredient (single) | | | | |
| --- | --- | --- | --- | --- | --- |
|  | a | b | c | d | e |
| Prior probability | $1/(6+\epsilon)$ | $2/(6+\epsilon)$ | $2/(6+\epsilon)$ | $1/(6+\epsilon)$ | $\epsilon/(6+\epsilon)$ |
| Posterior probability | 2/9 | 3/9 | 2/9 | 1/9 | 1/9 |

To determine the personalized surprise score for recipe (a, b, e), method 400 simply takes these prior probability and posterior probability values and calculates the Kullback-Leibler distance using the following formula (mentioned above):

$$\Sigma_A P_2(A) \log \frac{P_2(A)}{P_1(A)},$$

where "A" is the set of ingredients {a, b, c, d, e}.

Once the personalized surprise score is computed, processing for method 400 completes. In some embodiments of the present invention, the surprise score is calculated for an existing artifact/component that is not known to the user. However, in other embodiments, existing components may be combined in new ways to form new artifacts, and the surprise score of the resulting artifacts may be used for the purpose of new product creation for targeted markets and/or demographics, for example.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed, and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Social Networking Service (SNS): any digital platform by which individuals or groups share, create, discuss, and/or modify content. Examples of SNS types include, but are not limited to, the following: (i) location-based; (ii) collection and/or bookmarking-based; (iii) food-based; (iv) recipe-based; (v) photography-based; (vi) chat-based; (vii) dating-based; (viii) order/delivery-based; (ix) company-based; (x) industry-based; (xi) interest-based; and/or (xii) general purpose.

Social Networking Connection: any individual or group connected to a user via a social networking service. Connections are sometimes also referred to as "friends," "circles", "followers", "contacts", and the like.

Personalized information: any information likely to have been created by or viewed by a particular user. Examples of personalized data include, but are not limited to: (i) activity by the user on a SNS; (ii) activity viewable by the user on a SNS; (iii) online purchase history of the user; (iv) browser history of the user; (v) blog posts by the user; (vi) website content created by and/or maintained by the user; (vi) user email content; (vii) user online chat content; and/or (viii) content created by a third party but attributing portions (such as quotations) to the user.

What is claimed is:

1. A computer-implemented method comprising:
receiving the identity of a first user;
receiving a first dataset pertaining to the first user;
building, utilizing the first dataset, an ontology of artifacts known to the first user, where the ontology includes a domain of food and a plurality of artifacts that include food recipes, the artifacts having corresponding characteristics that include food ingredients, and where at least one characteristic is shared between two or more artifacts;
receiving the identity of a first artifact, wherein the first artifact is not included in the ontology;
applying a probabilistic familiarity algorithm to the ontology with respect to the first artifact to yield a probabilistic familiarity value for the first artifact with respect to the first user; and
reporting the probabilistic familiarity value to the first user;
wherein:
the first dataset is received over a computer network;
the first dataset includes at least one piece of personalized information for the first user; and
applying the probabilistic familiarity algorithm to the ontology with respect to the first artifact to yield a probabilistic familiarity value for the first artifact with respect to the first user includes:

calculating a prior probability distribution for each artifact of the ontology using the probabilistic familiarity algorithm, wherein calculating the prior probability distribution for a given artifact using the probabilistic familiarity algorithm includes:

determining an ontology closeness representing an amount of closeness between the given artifact and a set of artifacts that are determined to be similar to the given artifact based on the artifacts' respective characteristics, determining a social proximity measure representing an amount of closeness between the first user and a set of persons within a social network of the first user, determining a temporal proximity measure representing an amount of closeness between a time the given artifact was observed by the first user and a set of time points prior to the time the given artifact was observed by the first user, and utilizing the ontology closeness, the social proximity measure, and the temporal proximity measure to create a weighted frequency for the given artifact, the weighted frequency corresponding to the prior probability distribution; and calculating a probabilistic familiarity value for the first artifact by adding the first artifact to the set of artifacts and calculating the first artifact's prior probability distribution using the probabilistic familiarity algorithm.

2. The method of claim 1, further comprising:
determining if the probabilistic familiarity value is below a first probabilistic familiarity threshold,
wherein if the probabilistic familiarity value is below the first probabilistic familiarity threshold, the first artifact is added to a set of artifact(s) that are not familiar to the first user.

3. The method of claim 1, wherein:
the personalized information includes: activity by the user on a social networking service (SNS); activity viewable by the user on a SNS; online purchase history of the user; online browser history of the user; website content created by the user; and content created by a third party but attributing portions to the user.

4. The method of claim 1, wherein:
the probabilistic familiarity algorithm is a Bayesian surprise-based algorithm.

5. The method of claim 1, wherein:
the first dataset further includes at least one piece of personalized information for a first social networking connection of the first user, where the user is connected to the first social networking connection on a first social networking service.

6. The method of claim 5, wherein:
the first dataset further includes at least one piece of personalized information for a second social networking connection, where the second social networking connection is connected to the first social networking connection on the first social networking service.

7. A computer program product comprising a computer readable storage medium having stored thereon:
program instructions programmed to receive the identity of a first user;
program instructions programmed to receive a first dataset pertaining to the first user;
program instructions programmed to build an ontology of artifacts known to the first user, where the ontology includes a domain and a plurality of artifacts, the artifacts having corresponding characteristics, where at least one characteristic is shared between two or more artifacts;
program instructions programmed to receive the identity of a first artifact, wherein the first artifact is not included in the ontology;
program instructions programmed to apply a probabilistic familiarity algorithm to the ontology with respect to the first artifact to yield a probabilistic familiarity value for the first artifact with respect to the first user; and
program instructions programmed to report the probabilistic familiarity value to the first user;
wherein:
the first dataset is received over a computer network;
the first dataset includes at least one piece of personalized information for the first user; and
applying the probabilistic familiarity algorithm to the ontology with respect to the first artifact to yield a probabilistic familiarity value for the first artifact with respect to the first user includes:
calculating a prior probability distribution for each artifact of the ontology using the probabilistic familiarity algorithm, wherein calculating the prior probability distribution for a given artifact using the probabilistic familiarity algorithm includes:

determining an ontology closeness representing an amount of closeness between the given artifact and a set of artifacts that are determined to be similar to the given artifact based on the artifacts' respective characteristics, determining a social proximity measure representing an amount of closeness between the first user and a set of persons within a social network of the first user, determining a temporal proximity measure representing an amount of closeness between a time the given artifact was observed by the first user and a set of time points prior to the time the given artifact was observed by the first user, and utilizing the ontology closeness, the social proximity measure, and the temporal proximity measure to create a weighted frequency for the given artifact, the weighted frequency corresponding to the prior probability distribution; and calculating a probabilistic familiarity value for the first artifact by adding the first artifact to the set of artifacts and calculating the first artifact's prior probability distribution using the probabilistic familiarity algorithm.

8. The computer program product of claim 7, further comprising:
program instructions programmed to determine if the probabilistic familiarity value is below a first probabilistic familiarity threshold,
wherein if the probabilistic familiarity value is below the first probabilistic familiarity threshold, the first artifact is added to a set of artifact(s) that are not familiar to the first user.

9. The computer program product of claim 7, wherein:
the personalized information includes: activity by the user on a social networking service (SNS); activity viewable by the user on a SNS; online purchase history of the user; online browser history of the user; website content created by the user; and content created by a third party but attributing portions to the user.

10. The computer program product of claim 7, wherein:
the probabilistic familiarity algorithm is a Bayesian surprise-based algorithm.

11. The computer program product of claim 7, wherein:
the first dataset further includes at least one piece of personalized information for a first social networking connection of the first user, where the user is connected to the first social networking connection on a first social networking service.

12. The computer program product of claim 11, wherein:
the first dataset further includes at least one piece of personalized information for a second social networking connection, where the second social networking connection is connected to the first social networking connection on the first social networking service.

13. A computer system comprising:
a processor(s) set; and
a computer readable storage medium;
wherein:
the processor set is structured, located, connected and/or programmed to run program instructions stored on the computer readable storage medium; and
the program instructions include:
  program instructions programmed to receive the identity of a first user;
  program instructions programmed to receive a first dataset pertaining to the first user;
  program instructions programmed to build an ontology of artifacts known to the first user, where the ontology includes a domain and a plurality of artifacts, the artifacts having corresponding characteristics, where at least one characteristic is shared between two or more artifacts;
  program instructions programmed to receive the identity of a first artifact, wherein the first artifact is not included in the ontology;
  program instructions programmed to apply a probabilistic familiarity algorithm to the ontology with respect to the first artifact to yield a probabilistic familiarity value for the first artifact with respect to the first user; and
  program instructions programmed to report the probabilistic familiarity value to the first user;
wherein:
the first dataset is received over a computer network;
the first dataset includes at least one piece of personalized information for the first user; and
applying the probabilistic familiarity algorithm to the ontology with respect to the first artifact to yield a probabilistic familiarity value for the first artifact with respect to the first user includes:
calculating a prior probability distribution for each artifact of the ontology using the probabilistic familiarity algorithm, wherein calculating the prior probability distribution for a given artifact using the probabilistic familiarity algorithm includes:
  determining an ontology closeness representing an amount of closeness between the given artifact and a set of artifacts that are determined to be similar to the given artifact based on the artifacts' respective characteristics,
  determining a social proximity measure representing an amount of closeness between the first user and a set of persons within a social network of the first user,
  determining a temporal proximity measure representing an amount of closeness between a time the given artifact was observed by the first user and a set of time points prior to the time the given artifact was observed by the first user, and
  utilizing the ontology closeness, the social proximity measure, and the temporal proximity measure to create a weighted frequency for the given artifact, the weighted frequency corresponding to the prior probability distribution; and
calculating a probabilistic familiarity value for the first artifact by adding the first artifact to the set of artifacts and calculating the first artifact's prior probability distribution using the probabilistic familiarity algorithm.

14. The computer system of claim 13, further comprising:
program instructions programmed to determine if the probabilistic familiarity value is below a first probabilistic familiarity threshold,
wherein if the probabilistic familiarity value is below the first probabilistic familiarity threshold, the first artifact is added to a set of artifact(s) that are not familiar to the first user.

15. The computer system of claim 13, wherein:
the personalized information includes: activity by the user on a social networking service (SNS); activity viewable by the user on a SNS; online purchase history of the user; online browser history of the user; website content created by the user; and content created by a third party but attributing portions to the user.

16. The computer system of claim 13, wherein:
the probabilistic familiarity algorithm is a Bayesian surprise-based algorithm.

17. The computer system of claim 13, wherein:
the first dataset further includes at least one piece of personalized information for a first social networking connection of the first user, where the user is connected to the first social networking connection on a first social networking service.

18. The computer system of claim 17, wherein:
the first dataset further includes at least one piece of personalized information for a second social networking connection, where the second social networking connection is connected to the first social networking connection on the first social networking service.

* * * * *